United States Patent
Ohno

(10) Patent No.: US 10,814,925 B2
(45) Date of Patent: Oct. 27, 2020

(54) CUSTOMIZED PROPOSAL SYSTEM OF VEHICLE PART

(71) Applicant: TOYOTA JIDOSHA KABUSHIKI KAISHA, Toyota-shi (JP)

(72) Inventor: Satoru Ohno, Chita-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 48 days.

(21) Appl. No.: 16/360,171

(22) Filed: Mar. 21, 2019

(65) Prior Publication Data

US 2019/0344846 A1 Nov. 14, 2019

(30) Foreign Application Priority Data

May 11, 2018 (JP) ................................ 2018-092238

(51) Int. Cl.
*B62D 65/00* (2006.01)
*G05B 19/4099* (2006.01)
*G07C 5/08* (2006.01)

(52) U.S. Cl.
CPC ......... *B62D 65/00* (2013.01); *G05B 19/4099* (2013.01); *G07C 5/085* (2013.01); *G05B 2219/35134* (2013.01)

(58) Field of Classification Search
None
See application file for complete search history.

(56) References Cited

U.S. PATENT DOCUMENTS

| | | | | |
|---|---|---|---|---|
| 2002/0161563 A1* | 10/2002 | Elabiad | ................... | G06F 30/15 703/8 |
| 2005/0085965 A1* | 4/2005 | Issa | ................... | H04L 67/125 701/33.4 |
| 2005/0171867 A1* | 8/2005 | Doonan | ............. | G06Q 30/0643 705/26.4 |
| 2007/0033845 A1* | 2/2007 | Sherman, Jr. | ........... | G09F 21/04 40/611.01 |
| 2010/0217616 A1* | 8/2010 | Colson | ................... | G06Q 30/02 705/1.1 |
| 2014/0229311 A1* | 8/2014 | Colson | ............... | G06Q 30/0605 705/26.2 |
| 2015/0316390 A1* | 11/2015 | Kameyama | .......... | G08G 1/0129 701/537 |
| 2017/0098272 A1* | 4/2017 | Brockman | ............ | G06F 3/0482 |
| 2019/0054873 A1* | 2/2019 | Liongosari | ............ | B60R 16/037 |

FOREIGN PATENT DOCUMENTS

JP    2017-010581    1/2017

* cited by examiner

*Primary Examiner* — Ryan A Jarrett
(74) *Attorney, Agent, or Firm* — Oblon, McClelland, Maier & Neustadt, L.L.P.

(57) ABSTRACT

A customized proposal system for a vehicle part capable of performing a proposal for a design part that matches user's preference is provided. The customized proposal system for the vehicle part includes a vehicle operating information acquisition unit configured to acquire vehicle operating information at least including traveling information on a vehicle; and a proposal unit configured to estimate preference of a vehicle user based on the vehicle operating information, perform selection of a part attachment position in the vehicle and design of the design part to be attached to the part attachment position based on the preference of the vehicle user that has been estimated, and propose the design part that has been designed to the vehicle user.

8 Claims, 5 Drawing Sheets

CUSTOMIZED PROPOSAL SYSTEM OF VEHICLE PART

CROSS REFERENCE TO RELATED APPLICATIONS

This application is based upon and claims the benefit of priority from Japanese patent application No. 2018-092238, filed on May 11, 2018, the disclosure of which is incorporated herein in its entirety by reference.

BACKGROUND

The present disclosure relates to a customized proposal system for a vehicle part.

In recent years, service proposal-type systems that make proposals for services according to people's preferences have been studied. For example, Japanese Unexamined Patent Application Publication No. 2017-010581 discloses a service proposal system in which a person and a target such as a possession or a vehicle possessed by this person are recognized from image data that has been acquired and service information based on a combination of the person and the target that have been recognized is provided.

SUMMARY

When the target object regarding which the service is proposed is a vehicle, it may be possible to make a proposal for a design part to the user for the purpose of enabling the user to decorate the vehicle as a service that can be provided to the user after the user has purchased the vehicle. However, at the time point where the user has purchased the vehicle, information that may be used to estimate user's preference is limited to information such as the type and the color of the vehicle that the user has purchased. Therefore, it is difficult to estimate user's preference with a high accuracy and to make a proposal for the design part that matches user's preference.

The present disclosure has been made in view of the aforementioned circumstances, and aims to provide a customized proposal system for a vehicle part capable of making a proposal for the design part that more accurately matches user's preference.

The present disclosure is a customized proposal system for a vehicle part, including: a vehicle operating information acquisition unit configured to acquire vehicle operating information at least including traveling information on a vehicle; and a proposal unit configured to estimate the preference of a vehicle user based on the vehicle operating information, perform selection of a part attachment position in the vehicle and design of a design part to be attached to the part attachment position based on the preference of the vehicle user that has been estimated, and propose the design part that has been designed to the vehicle user.

Vehicle user's character and preference tend to be reflected in their way of driving the vehicle. It is possible to estimate the preference of the vehicle user from the way they drive. For example, a vehicle user who starts the vehicle suddenly or suddenly accelerates the vehicle frequently tends to have a relatively short-tempered character and prefers a fancy design, whereas a vehicle user who drives a car stably at around a legal speed limit has a solid character and prefers a conservative design. By acquiring the vehicle operating information such as speed, acceleration, and the number of rotations at least including traveling information on a vehicle and analyzing the vehicle operating information by a learned model or the like, the accuracy of estimating the preference of the vehicle user can be improved. Then, by designing the design part based on the preference of the vehicle user that has been estimated, it becomes possible to provide a design part that more accurately matches the vehicle user's preference for the vehicle user.

Further, the proposal unit performs the selection of the part attachment position from positions other than a predetermined restricted position in the vehicle. Since it is possible that positions such as the windshield where attachment of the design part is legally restricted or positions such as the accelerator pedal or the brake pedal that relate to the basic performance of the vehicle may cause trouble, these positions are set as predetermined restricted positions. Regarding the predetermined restricted positions, no proposal is made for the design part.

Further, the proposal unit may modify design of the design part based on a request for modification by the vehicle user regarding the design part that has been proposed. According to this configuration, the design part that has been proposed more accurately matches preference of the vehicle user, whereby it is possible to further increase the probability that the vehicle user will purchase this design part.

Further, the proposal unit may transmit a proposal for the design part that has been designed to a predetermined terminal that the vehicle user has registered in advance, and when the proposal unit has received a signal indicating that the proposal will be accepted from the predetermined terminal, the proposal unit may transmit an instruction to manufacture the design part that has been proposed and design information on this design part that has been proposed to a predetermined facility. The proposal is transmitted to a predetermined terminal and the vehicle user who has seen this proposal sends back a message indicating that the user will accept this proposal using the predetermined terminal when the user accepts the proposal, whereby it is possible to promptly grasp the intention of purchasing the design part. When the signal indicating that the proposal will be accepted has been received from the predetermined terminal, an instruction to manufacture the design part that has been proposed and design information on this design part that has been proposed are transmitted to a predetermined facility immediately, whereby it is possible to perform efficient order processing.

The predetermined facility is a facility that includes an automobile maintenance function when the size of the design part is smaller than a predetermined size, and the predetermined facility is a facility that includes a manufacturing function when the size of the design part is equal to or larger than the predetermined size. A manufacturing facility where large-sized design parts can be manufactured may be installed in the facility such as a factory that includes the manufacturing function. On the other hand, only a manufacturing facility where relatively small-sized design parts are manufactured can be installed in the facility such as a dealer that includes the automobile maintenance function. Therefore, the predetermined size of the design part, which is a selection criterion of the predetermined facility, is preferably determined in view of the size of the manufacturing facility that can be installed in the facility that includes the automobile maintenance function.

Further, the proposal unit may set, when the predetermined facility includes the manufacturing function, a period from order to delivery to be longer than that in a case in which the predetermined facility includes an automobile maintenance function. In general, the number of facilities such as factories that include the manufacturing function is extremely smaller than the number of facilities such as dealers that include the automobile maintenance function. Therefore, the period from the time when manufacturing instructions are received to the time when the design part is completed in the case in which the design part is manufactured in the facility that includes the manufacturing function is longer than that in the case in which the design part is manufactured in the facility that includes the automobile maintenance function. Further, since the facility that includes the automobile maintenance function attaches the design part to the vehicle of the vehicle user, a period in which the finished design part is delivered from the facility that includes the manufacturing function to the facility that includes the automobile maintenance function needs to be taken into account. When the predetermined facility includes the manufacturing function, the period from order to delivery is set as described above, whereby it is possible to prevent a delay in the delivery date more definitely.

Further, the proposal unit may refer to a list of second-hand design parts that have been stored, and when there is a second-hand design part among the second-hand design parts that is similar to the design part that has been designed, the proposal unit may make a proposal for this second-hand design part to the vehicle user. By reselling the second-hand design part that has been traded in, it becomes possible to effectively use resources. Further, the second-hand design parts may be provided more cheaply and in a shorter period than a design part to be newly manufactured, which is advantageous also for the vehicle user.

Further, the proposal unit may determine a timing when a proposal is made to the vehicle user based on the vehicle operating information. That is, based on the vehicle operating information on the vehicle user, an optimal timing when a proposal should be made to the vehicle user is calculated, and a proposal is made to the user at the proposal timing that has been calculated. When, for example, it is estimated, from the results of analyzing the vehicle operating information on the vehicle user, that this user has a personality that causes him/her to tend to get tired of things, proposals are made frequently. According to this configuration, it is possible to further increase the probability that the vehicle user will purchase the design part that has been proposed.

According to the present disclosure, it is possible to make a proposal for a design part that more accurately matches user's preference.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, the disclosure will be described based on the following embodiment. However, the present disclosure set forth in the claims are not intended to be limited to the following embodiment. Moreover, it is not absolutely necessary to provide all the configurations to be described in the following embodiment as means for solving the problem. For the sake of clarification of the description, the following description and the drawings are omitted and simplified as appropriate. The same elements are denoted by the same reference symbols throughout the drawings, and repetitive descriptions are avoided as necessary.

Figure 1:
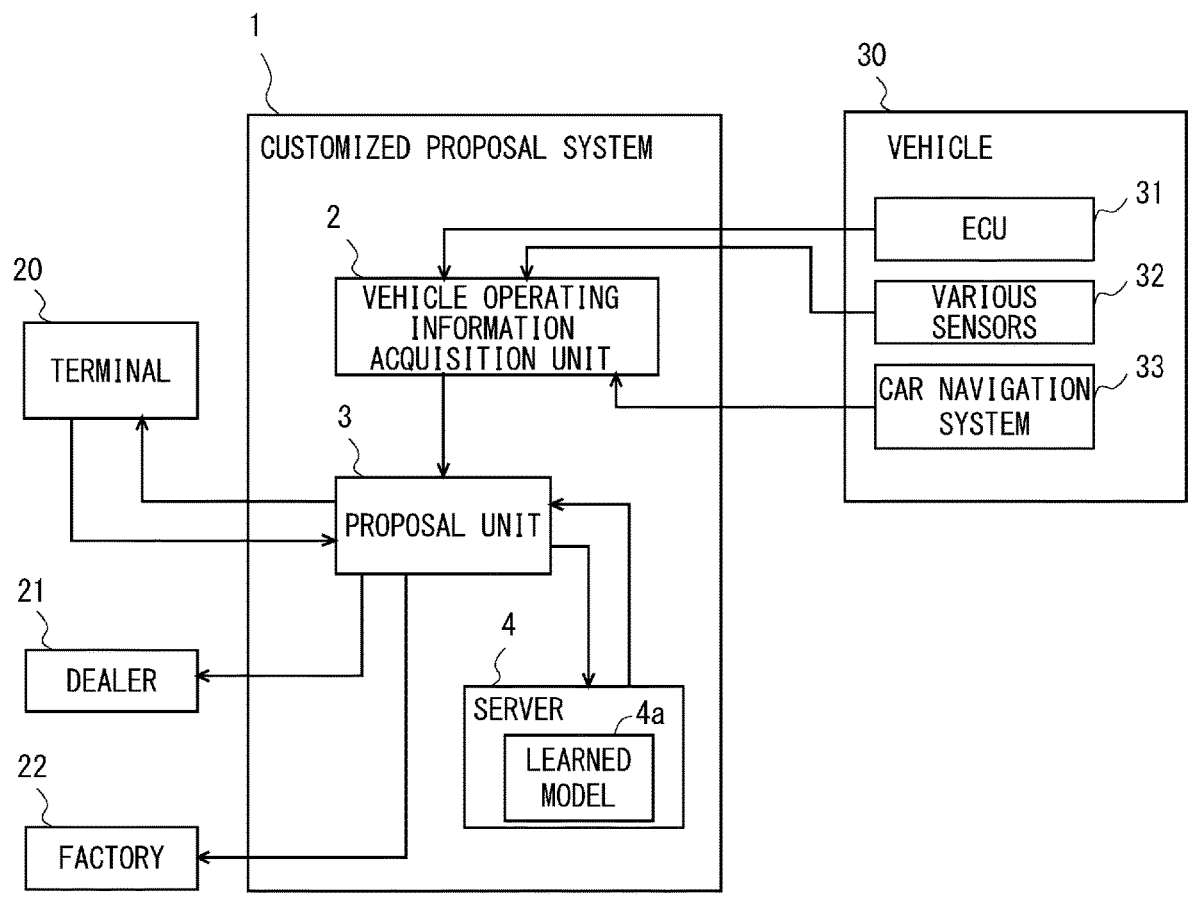
FIG. 1 is a schematic view showing one example of a configuration of a customized proposal system for a vehicle part according to an embodiment.

Referring first to FIG. 1, a configuration of a customized proposal system for a vehicle part according to this embodiment will be explained.

FIG. 1 is a schematic view showing one example of a configuration of a customized proposal system 1 for the vehicle part according to this embodiment. As shown in FIG. 1, the customized proposal system 1 for the vehicle part includes a vehicle operating information acquisition unit 2 and a proposal unit 3.

The vehicle operating information acquisition unit 2 acquires vehicle operating information including at least travelling information of a vehicle 30. The vehicle operating information acquisition unit 2 is installed in the vehicle 30. The traveling information on the vehicle 30 is, for example, speed, acceleration, engine speed, engine start time, brake operations and the like that can be acquired from an Engine Control Unit (ECU) 31 and various sensors 32 in the vehicle 30. When the vehicle 30 includes a car navigation system 33, the vehicle operating information may include information regarding a traveling route acquired from a Global Positioning System (GPS) of the car navigation system 33.

The proposal unit 3 estimates vehicle user's (user's) preference based on the vehicle operating information acquired by the vehicle operating information acquisition unit 2 and proposes design parts to be attached to the vehicle 30. The proposal unit 3 is placed, for example, in a vehicle manufacturer. Transmission of the information from the vehicle operating information acquisition unit 2 to the proposal unit 3 is performed via radio communication, an Internet line or the like. The proposal unit 3 specifies the driving pattern of the user based on the vehicle operating information of the vehicle 30 that has been acquired. The proposal unit 3 analyzes the specified driving pattern by referring to a learned model 4a stored in a server 4 or the like, and estimates the character and the preference of the user.

User's character and preference tend to be reflected in their way of driving the vehicle. It is possible to estimate user's preference from the learned model 4a. For example, a user who starts the vehicle 30 suddenly or suddenly accelerates the vehicle 30 frequently tends to have a relatively short-tempered character and prefers a fancy design, whereas a user who drives a car stably at around a legal speed limit has a solid character and prefers a conservative design.

Further, the proposal unit 3 performs selection of a part attachment position in the vehicle 30 and design of the design part to be attached to the part attachment position based on the user's preference that has been estimated. The design part is, for example, a part such as an animal-shaped object or a wrapping film designed for racing vehicles that is intended to decorate the vehicle 30. The proposal unit 3 performs selection of the part attachment position from positions other than predetermined restricted positions in the vehicle 30. The predetermined restricted positions mean, for example, positions such as the windshield where attachment of the design part is legally restricted or positions such as the accelerator pedal or the brake pedal that relates to the basic performance of the vehicle 30. That is, the part attachment position is, for example, a position such as an instrument panel, a sheet, the interior lamp, a door handle, a mirror, or the front grille in which attachment of the design part is not legally restricted and does not relate to the basic performance of the vehicle 30.

The price range of a design part to be designed is set in view of the grade of the vehicle 30 of the user, the price of a design part that the user has purchased in the past and the like. For example, the price range of a design part to be proposed to the user having a high-grade automobile is set high and the price range of a design part to be proposed to the user having a moderate-grade automobile is set low.

The server 4 may store a list of second-hand design parts that have been traded in and stored. The proposal part 3 refers to the list of the second-hand design parts that have been traded in and stored, and when there is a second-hand design part among the second-hand design parts that is similar to the design part that has been designed, the proposal unit 3 may make a proposal for this second-hand design part to the user. By reselling the second-hand design parts that are stored in this way, it is possible to effectively use resources. Further, the second-hand design parts may be provided more cheaply and in a shorter period than a design part to be newly manufactured, which is advantageous also for the user. A questionnaire survey in which the stored second-hand design parts are placed on a website of interest to the user of the vehicle 30 and the user selects some of the designs they like from the second-hand design parts may be executed. The proposal unit 3 performs estimation of user's preference by considering the results of the questionnaire survey, whereby it is possible to estimate user's preference with a higher accuracy.

Further, the proposal unit 3 includes a communication function for transmitting the proposal for the design part that has been designed to a predetermined terminal that the user has registered in advance. The predetermined terminal 20 is, for example, a smartphone or a Personal Computer (PC) owned by the user. The predetermined terminal 20 may be the car navigation system 33 provided in the vehicle 30.

The proposal unit 3 may determine a timing when a proposal is made to the user based on the vehicle operating information. That is, based on the vehicle operating information of the user, an optimal timing when a proposal should be made to the user is calculated, and a proposal is made to the user at the proposal timing that has been calculated. When, for example, it is estimated, from the results of analyzing the vehicle operating information of the user, that this user has a personality that causes him/her to tend to get tired of things, proposals are made frequently (e.g., every week). According to this configuration, it is possible to further increase the probability that the user will purchase the design part that has been proposed.

The proposal unit 3 may modify design of the design part that has been proposed based on a request for modification from the user transmitted from the user via the predetermined terminal 20. After the proposal unit 3 has made a proposal for the design part to the user, processing of receiving the request for modification from the user, transmitting the proposal for the design part after re-design performed while reflecting the request for modification from the user may be repeated a plurality of times, thereby determining the final design of the design part. According to this configuration, the design part that has been proposed more accurately matches user's preference, whereby it is possible to further increase the probability that the user will purchase this design part.

When the proposal unit 3 has received a signal indicating that the proposal will be accepted from the predetermined terminal 20, the proposal unit 3 transmits instructions to manufacture the design part that has been accepted and design information on this design part to a predetermined facility. The predetermined facility is, when the size of the design part is smaller than a predetermined size, a dealer 21, which is a facility that includes an automobile maintenance function. When the size of the design part is equal to or larger than the predetermined size, the predetermined facility is a factory 22, which is a facility that includes a manufacturing function.

A manufacturing facility (e.g., a large-sized 3D printer for business use) where large-sized design parts can be manufactured can be installed in the factory 22. On the other hand, only a manufacturing facility (e.g., a general-purpose small-sized 3D printer) where relatively small-sized design parts can be manufactured can be installed in the dealer 21 whose main purpose is automobile maintenance. Therefore, the predetermined size of the design part, which is a selection criterion of the predetermined facility, is determined in view of the size of the manufacturing facility that can be installed in the dealer 21.

When the predetermined facility includes the manufacturing function, the proposal unit 3 may set the period from order to delivery to be longer than that when the predetermined facility is the facility that includes the automobile maintenance function. The number of factories 22, each of which is a facility that includes the manufacturing function, is extremely smaller than the number of dealers 21, each of which is a facility that includes the automobile maintenance function. Therefore, the period from the time when manufacturing instructions are received to the time when the design part is completed in the case in which the design part is manufactured in the factory 22 is longer than that in the case in which the design part is manufactured in the dealer 21. Further, since the dealer 21 attaches the design part to the vehicle 30 of the user, a period in which the finished design part is delivered from the factory 22 to the dealer 21 needs to be taken into account as well. When the predetermined facility includes the manufacturing function, the period from order to delivery is set as described above, whereby it is possible to prevent a delay in the delivery date more definitely.

When the user has purchased the design part that has been proposed, information regarding the character and the preference of this user and the design part that has been proposed may be stored in the server 4 in such a way that they are associated with each other. According to this configuration, the number of parameters of data that can be referred to increases, whereby it becomes possible to make a proposal for the design part that more accurately matches user's preference and to increase the probability that the user will purchase the design part that has been proposed.

Next, a process flow of the customized proposal system 1 for the vehicle part will be explained below. In the following description, reference is made also to FIG. 1 as appropriate.

Figure 2:
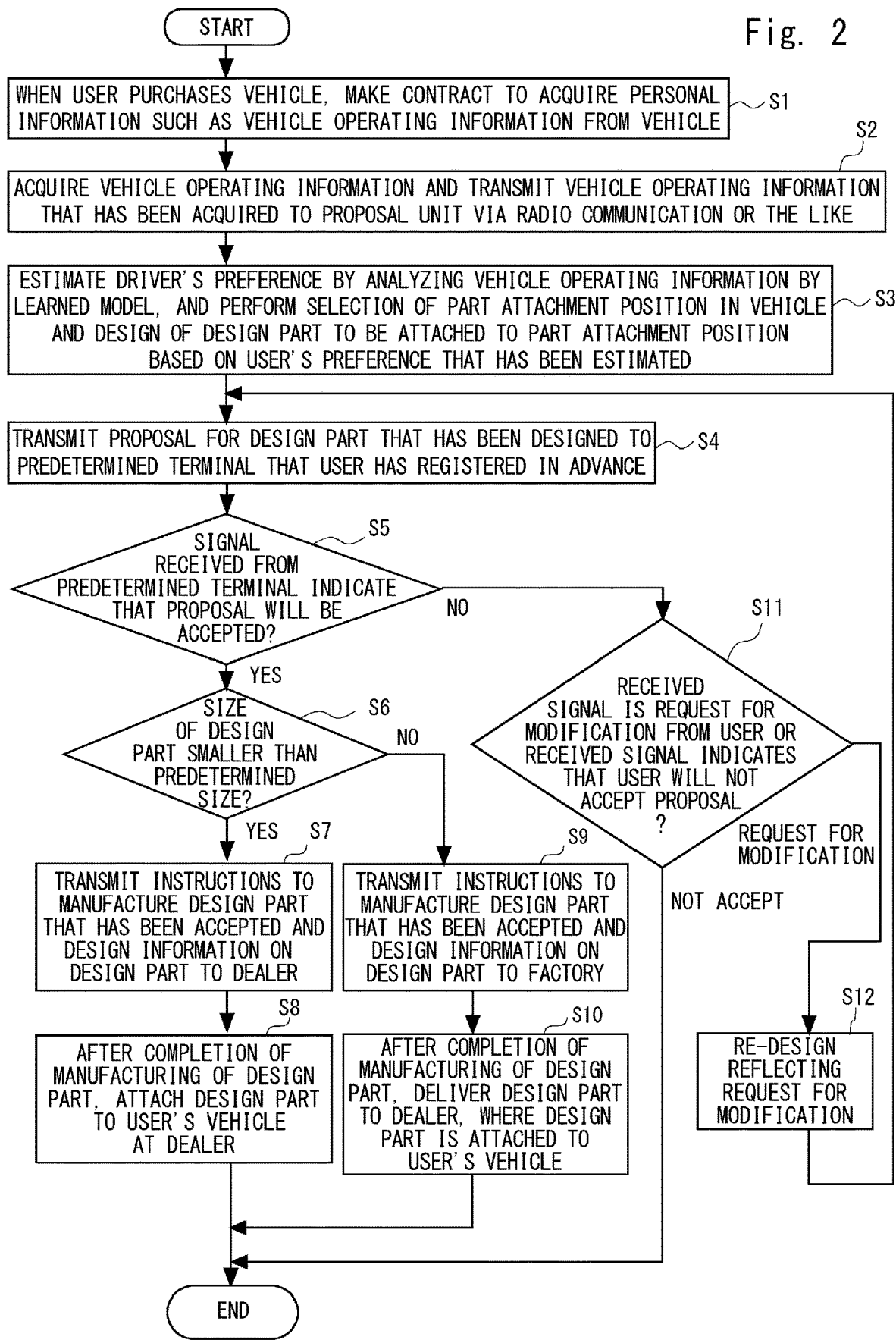
FIG. 2 is a flowchart showing a process flow of the customized proposal system for the vehicle part.

FIG. 2 is a flowchart showing a process flow of the customized proposal system 1 for the vehicle part. As shown in FIG. 2, first, when the user purchases the vehicle 30, the customized proposal system 1 makes a contract with the user to acquire personal information such as the vehicle operating information from the vehicle 30 (Step S1). Next, the vehicle operating information acquisition unit 2 acquires the vehicle operating information such as speed or acceleration from the ECU 31, the various sensors 32 and the like while the user is driving the vehicle 30, and transmits the vehicle operating information acquired via radio communication, an Internet line or the like to the proposal unit 3 (Step S2).

After Step S2, the proposal unit 3 estimates driver's preference by analyzing the vehicle operating information by the learned model, and performs selection of the part attachment position in the vehicle 30 and design of the design part to be attached to the part attachment position based on the user's preference that has been estimated (Step S3). Next, the proposal unit 3 transmits the proposal for the design part that has been designed to the predetermined terminal that the user has registered in advance via radio communication, an Internet line or the like (Step S4).

After Step S4, the proposal unit 3 determines whether the signal received from the predetermined terminal 20 indicates that the proposal will be accepted (Step S5). When it is determined in Step S5 that the signal indicating that the proposal will be accepted has been received (in the case of YES), the proposal unit 3 determines whether the size of the design part is smaller than a predetermined size (Step S6).

When it is determined in Step S6 that the size of the design part is smaller than the predetermined size (in the case of YES), instructions to manufacture the design part that has been accepted and design information on this design part are transmitted to the dealer 21, which is a facility that includes the automobile maintenance function (Step S7). When the manufacturing of the design part has been completed in the dealer 21, the design part is attached to the vehicle 30 of the user at the dealer 21 (Step S8).

When it is determined in Step S6 that the size of the design part is equal to or larger than the predetermined size (in the case of NO), instructions to manufacture the design part that has been accepted and design information regarding this design part are transmitted to the factory 22, which is the facility that includes the manufacturing function (Step S9). When the manufacturing of this design part has been completed in the factory 22, this design part is delivered to the dealer 21, where this design part is attached to the vehicle 30 of the user (Step S10).

When it is determined in Step S5 that the received signal is not a signal indicating that the proposal will be accepted (in the case of NO), the proposal unit 3 determines whether this received signal is a request for modification from the user or this received signal indicates that the user will not accept the proposal (Step S11). When it is determined in Step S11 that this received signal is a request for modification from the user, the proposal unit 3 performs re-design reflecting the request for modification from the user (Step S12), and the process returns to Step S4. When it is determined in Step S11 that the received signal indicates that the user will not accept the proposal, the processing is ended.

Modified Example 1

Another example (modified example 1) of the configuration of the customized proposal system 1 for the vehicle part according to this embodiment will be explained.

Figure 3:
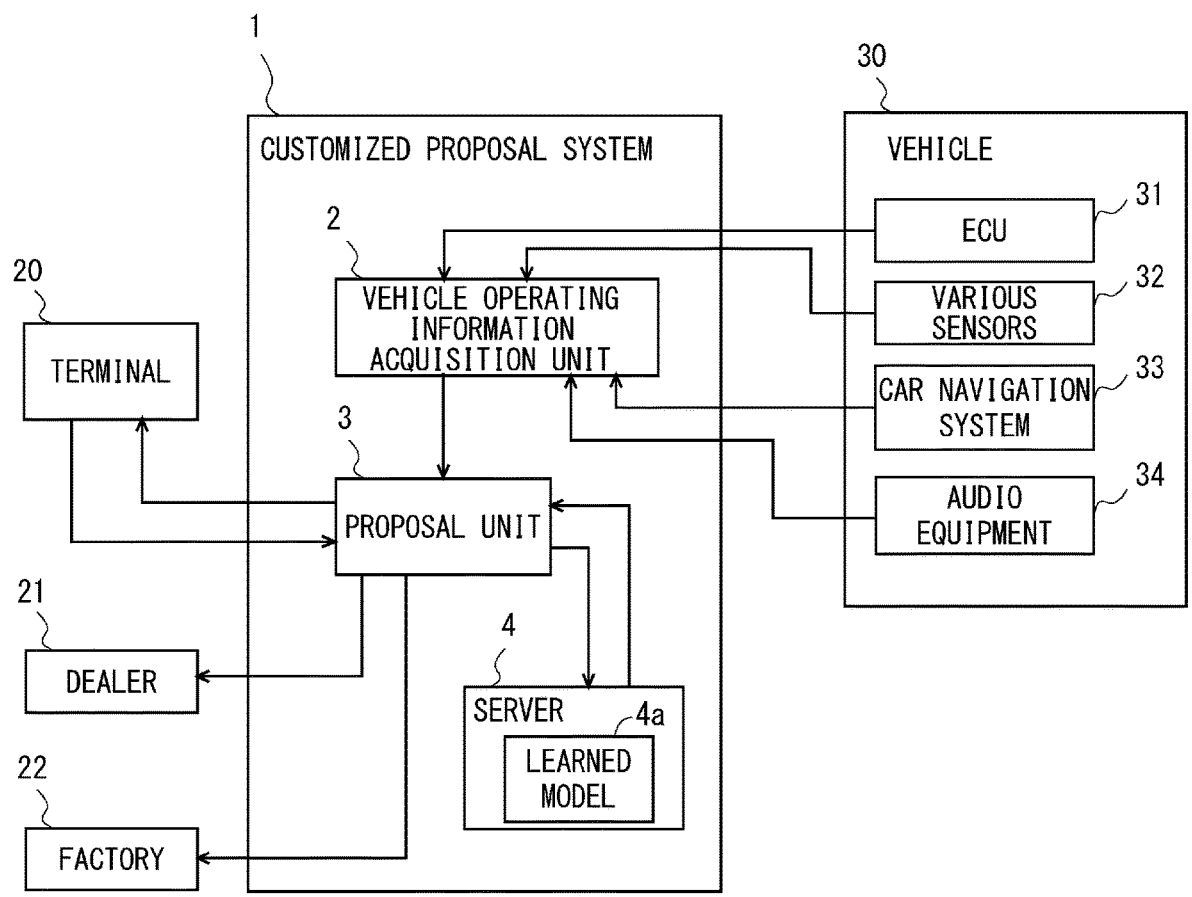
FIG. 3 is a schematic view showing another example (modified example 1) of the configuration of the customized proposal system for the vehicle part according to this embodiment.

FIG. 3 is a schematic view showing another example (modified example 1) of the configuration of the customized proposal system 1 for the vehicle part according to this embodiment. As shown in FIG. 3, in the configuration according to the modified example 1, the vehicle operating information acquisition unit 2 acquires an output signal of an audio equipment 34 installed in a vehicle cabin of the vehicle 30. The proposal unit 3 specifies audio output history of the user (music that has been played back, or a radio program or a television program that the user has listened or watched) from the output signal, and uses this audio output history to estimate user's preference. It is therefore possible to estimate user's preference more accurately. Since the audio output history is information that is more confidential than the vehicle operating information, when the user purchases the vehicle 30, the user is able to select whether to allow the customized proposal system 1 to acquire the audio output history.

Modified Example 2

One more example (modified example 2) of the configuration of the customized proposal system 1 for the vehicle part according to this embodiment will be explained.

Figure 4:
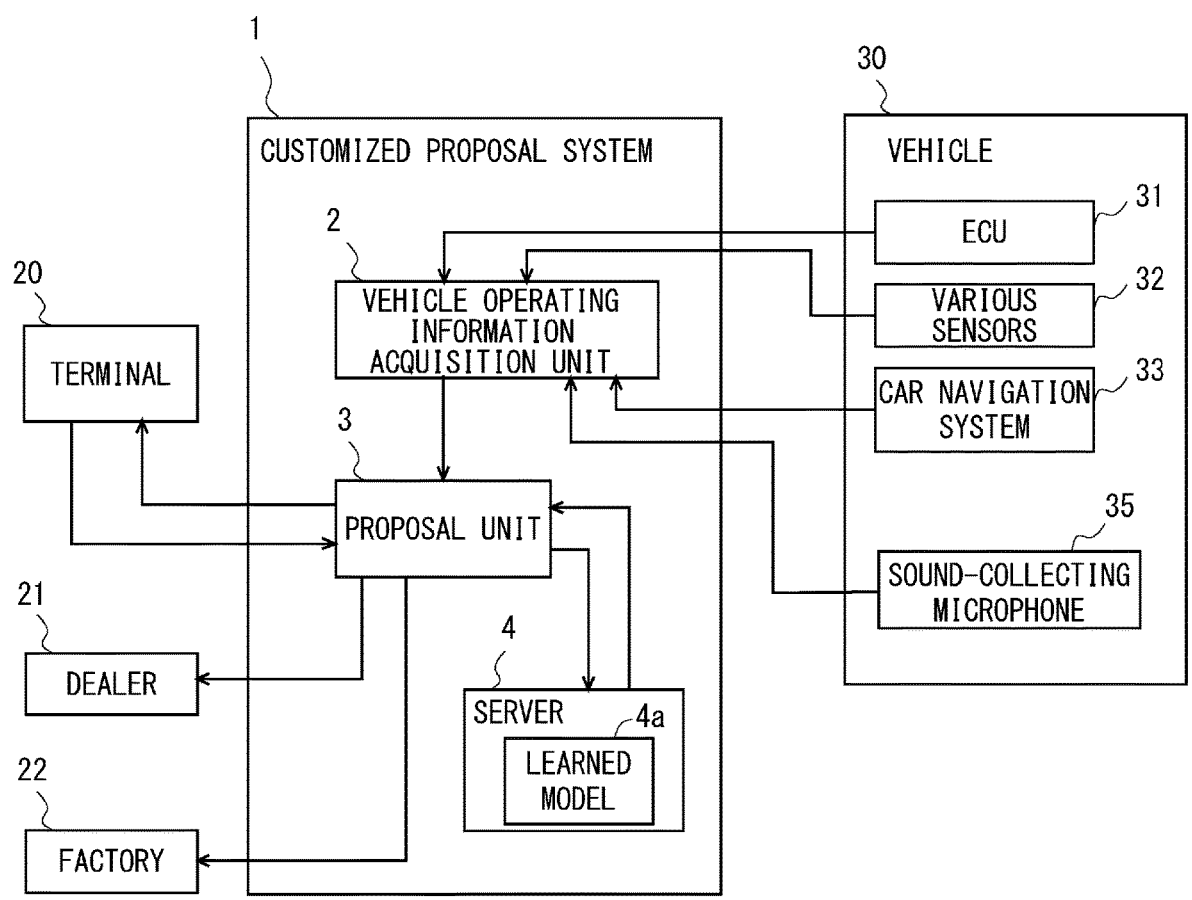
FIG. 4 is a schematic view showing one more example (modified example 2) of the configuration of the customized proposal system for the vehicle part according to this embodiment.

FIG. 4 is a schematic view showing one more example (modified example 2) of the configuration of the customized proposal system 1 for the vehicle part according to this embodiment. As shown in FIG. 4, a sound-collecting microphone 35 is installed in the vehicle cabin of the vehicle 30, and the vehicle operating information acquisition unit 2 is configured to acquire voice data in which conversation in the vehicle is collected via the sound-collecting microphone 35. The proposal unit 3 converts this voice data into character data, specifies a dialog pattern by analyzing which word is frequently used, and uses this dialog pattern to estimate user's preference. It is therefore possible to estimate user's preference more accurately. Since the voice data in which conversation in the vehicle is collected is information that is more confidential than the vehicle operating information, when the user purchases the vehicle 30, the user is able to select whether to allow the customized proposal system 1 to acquire the voice data in which conversation in the vehicle is collected. Further, a general-purpose voice recognition software may be used to convert the voice data into the character data.

Modified Example 3

One more example (modified example 3) of the configuration of the customized proposal system 1 for the vehicle part according to this embodiment will be explained.

Figure 5:
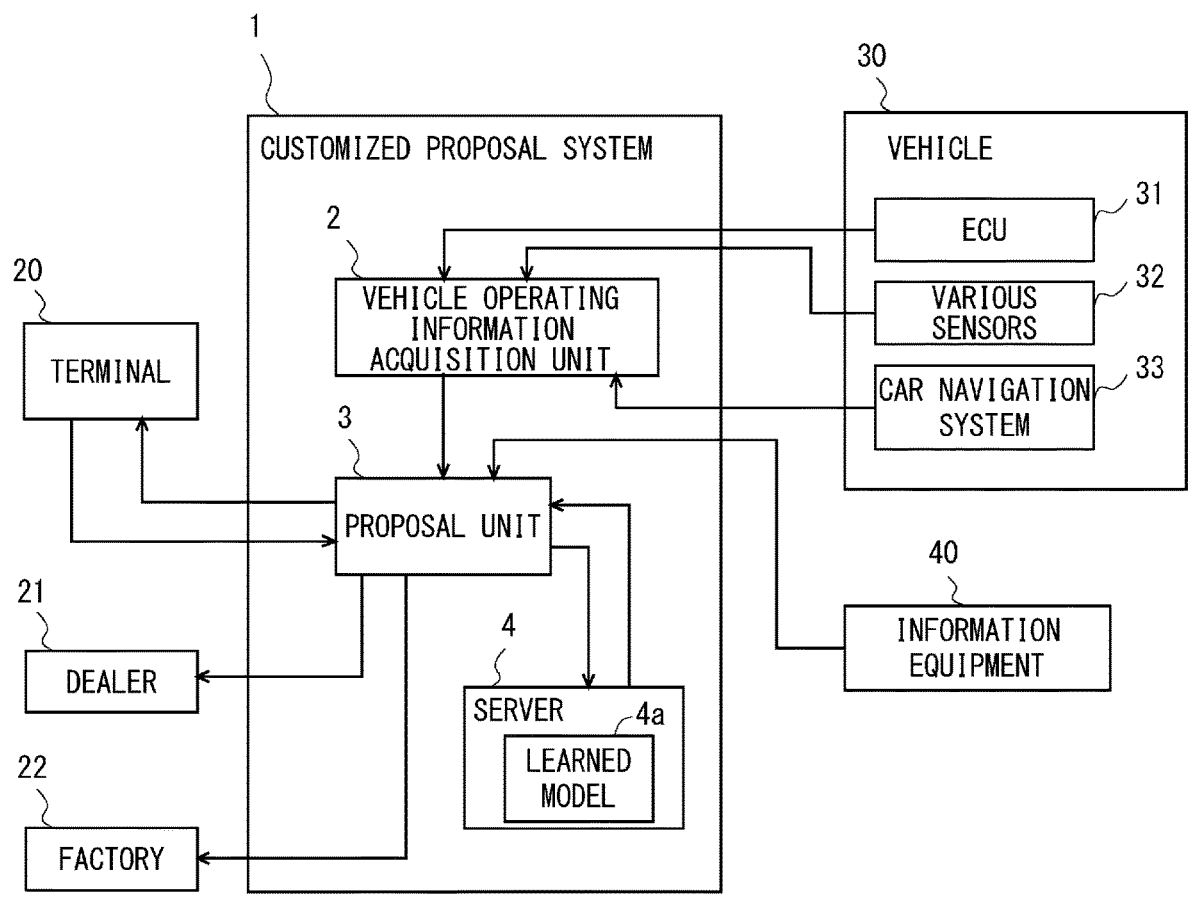
FIG. 5 is a schematic view showing one more example (modified example 3) of the configuration of the customized proposal system for the vehicle part according to this embodiment.

FIG. 5 is a schematic view showing one more example (modified example 3) of the configuration of the customized proposal system 1 for the vehicle part according to this embodiment. As shown in FIG. 5, in the configuration of the modified example 3, necessary information is collected in the proposal unit 3 from user's information equipment 40 such as a smartphone or a PC owned by the user.

The proposal unit 3 estimates user's preference based on the vehicle operating information acquired by the vehicle operating information acquisition unit 2 and information collected from these equipment. In this way, it becomes possible to estimate user's preference more accurately. Since the information acquired from the information equipment 40 of the user is information that is more confidential than the vehicle operating information, the user is able to select whether to allow the customized proposal system 1 to acquire voice data in which conversation in the vehicle is collected when the user purchases the vehicle 30.

According to the aforementioned configuration, the customized proposal system for the vehicle part according to this embodiment acquires the vehicle operating information at least including traveling information on a vehicle in the vehicle operating information acquisition unit. Further, the proposal unit estimates user's preference based on the vehicle operating information, and performs selection of the part attachment position in the vehicle and design of the design part to be attached to the part attachment position based on the user's preference that has been estimated. Then the proposal unit makes a proposal for the design part that has been designed to the user.

User's character and preference tend to be reflected on vehicle driving. By acquiring the vehicle operating information such as speed, acceleration, and the number of rotations at least including traveling information on a vehicle and analyzing the vehicle operating information by the learned model or the like, the accuracy of estimating the preference of the vehicle user can be improved. Then, by designing the design part based on the preference of the vehicle user that has been estimated, it becomes possible to provide a design part that more accurately matches the vehicle user's preference for the vehicle user.

The present disclosure is not limited to the aforementioned embodiment and may be changed as appropriate without departing from the spirit of the present disclosure. There is a case in which, for example, a plurality of persons use one vehicle. Therefore, the user of the vehicle can be changeably set, and the vehicle operating information may be acquired for each user of the vehicle. It is therefore possible to accurately estimate the preference of the vehicle user even when one vehicle is used by a plurality of users. Moreover, in the aforementioned embodiment, the aforementioned plurality of modified examples may be combined as appropriate.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A customized proposal system for a vehicle part, the system comprising:
   a vehicle operating information acquisition unit configured to acquire vehicle operating information at least including traveling information on a vehicle; and
   a proposal unit configured to estimate preference of a vehicle user based on the vehicle operating information, perform selection of a part attachment position in the vehicle and design of a design part to be attached to the part attachment position based on the preference of the vehicle user that has been estimated, and propose the design part that has been designed to the vehicle user.

2. The customized proposal system for the vehicle part according to claim 1, wherein the proposal unit performs the selection of the part attachment position from positions other than a predetermined restricted position in the vehicle.

3. The customized proposal system for the vehicle part according to claim 1, wherein the proposal unit modifies design of the design part based on a request for modification by the vehicle user regarding the design part that has been proposed.

4. The customized proposal system for the vehicle part according to claim 1, wherein
   the proposal unit transmits a proposal for the design part that has been designed to a predetermined terminal that the vehicle user has registered in advance, and
   when the proposal unit has received a signal indicating that the proposal will be accepted from the predetermined terminal, the proposal unit transmits an instruction to manufacture the design part that has been proposed and design information on this design part that has been proposed to a predetermined facility.

5. The customized proposal system for the vehicle part according to claim 4, wherein
   the predetermined facility is a facility that includes an automobile maintenance function when the size of the design part is smaller than a predetermined size, and
   the predetermined facility is a facility that includes a manufacturing function when the size of the design part is equal to or larger than the predetermined size.

6. The customized proposal system for the vehicle part according to claim 5, wherein the proposal unit sets, when the predetermined facility includes the manufacturing function, a period from order to delivery to be longer than that in a case in which the predetermined facility includes an automobile maintenance function.

7. The customized proposal system for the vehicle part according to claim 1, wherein the proposal unit refers to a list of second-hand design parts that have been stored, and when there is a second-hand design part among the second-hand design parts that is similar to the design part that has been designed, the proposal unit makes a proposal for the second-hand design part to the vehicle user.

8. The customized proposal system for the vehicle part according to claim 1, wherein the proposal unit determines a timing when a proposal is made to the vehicle user based on the vehicle operating information.

* * * * *